United States Patent [19]

Friedrich

[11] Patent Number: 5,409,343
[45] Date of Patent: Apr. 25, 1995

[54] SHIP LOADER OR UNLOADER

[75] Inventor: Hans-Jürgen Friedrich, Saarbrücken, Germany

[73] Assignee: O&K Orenstein & Koppel AG, Berlin, Germany

[21] Appl. No.: 945,657

[22] PCT Filed: Jan. 14, 1992

[86] PCT No.: PCT/EP92/00060
§ 371 Date: Nov. 13, 1992
§ 102(e) Date: Nov. 13, 1992

[87] PCT Pub. No.: WO92/12084
PCT Pub. Date: Jul. 23, 1992

[30] Foreign Application Priority Data

Jan. 14, 1991 [DE] Germany ............ 41 00 852.9

[51] Int. Cl.⁶ .............................. B65G 23/44
[52] U.S. Cl. ................ 414/141.1; 198/509; 198/709
[58] Field of Search ........ 198/509, 709, 710, 712, 198/813, 838; 414/141.1, 142.5

[56] References Cited

U.S. PATENT DOCUMENTS

| | | | |
|---|---|---|---|
| 4,830,177 | 5/1989 | Baba et al. | 414/141.1 X |
| 4,860,884 | 8/1989 | Kostrewa | 198/509 |
| 4,890,719 | 1/1990 | Yagi et al. | 414/141.1 X |
| 4,917,234 | 4/1990 | Seymour | 198/509 X |
| 4,988,250 | 1/1991 | Yamanaka | 414/141.1 |

FOREIGN PATENT DOCUMENTS 0236845  9/1987  European Pat. Off. .
0401406  12/1990  European Pat. Off. .
3029863   3/1982  Germany .
59-064406  4/1984  Japan .
59-78012   5/1984  Japan .................. 414/141.1

*Primary Examiner*—Michael S. Huppert
*Assistant Examiner*—Janice L. Krizek
*Attorney, Agent, or Firm*—Spencer, Frank & Schneider

[57] ABSTRACT

A ship loader or unloader includes a vertically extending first region and a horizontally extending second region; a first hydraulic cylinder connected to a lower end of the first region and to the second region for translationally displacing the second region relative to the first region as a function of vertical ship motions; a bucket mechanism including a chain and buckets mounted on the chain; guides, including a guide wheel, mounted in the first and second regions for continuously guiding the chain on the first and second regions; and a chain length equalizer in the second region for varying a chain length in the second region as a function of displacements of the second region relative to the first region. The chain length equalizer includes a second hydraulic cylinder effecting a length variation of the chain. The first hydraulic cylinder is connected to and extends between a first support forming a part of the first region; and an abutment forming part of the second region. The second hydraulic cylinder is a sole hydraulic cylinder connected to and extending between the chain wheel and a second support forming a part of the second region. An actuation of the first hydraulic cylinder effects simultaneous actuation of the second cylinder.

5 Claims, 2 Drawing Sheets

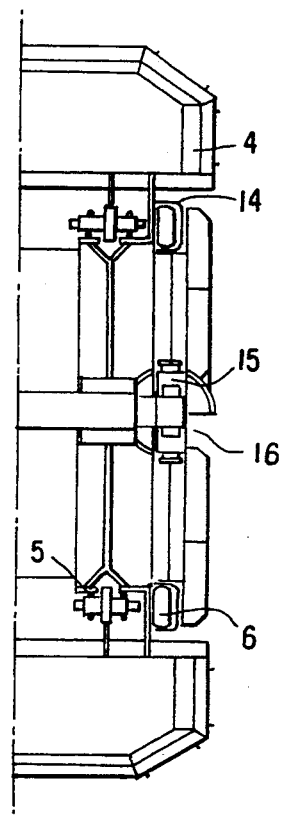
FIG. 3A
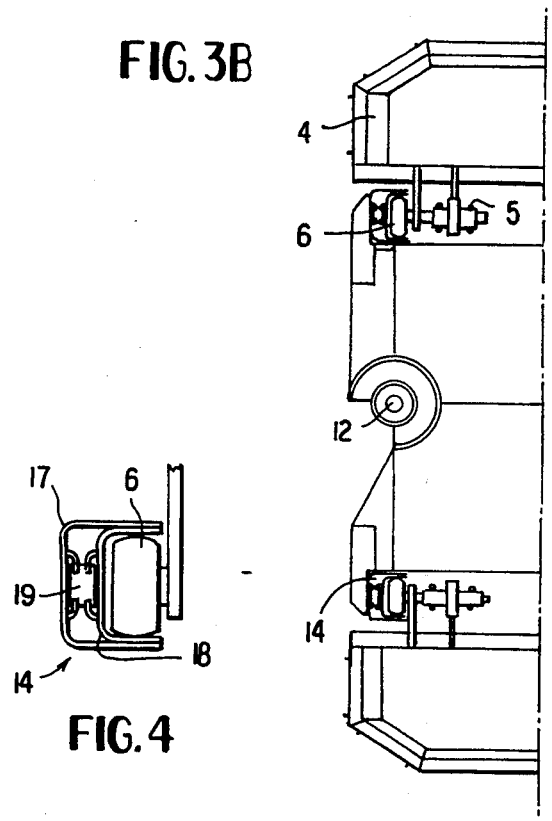
FIG. 3B
FIG. 4
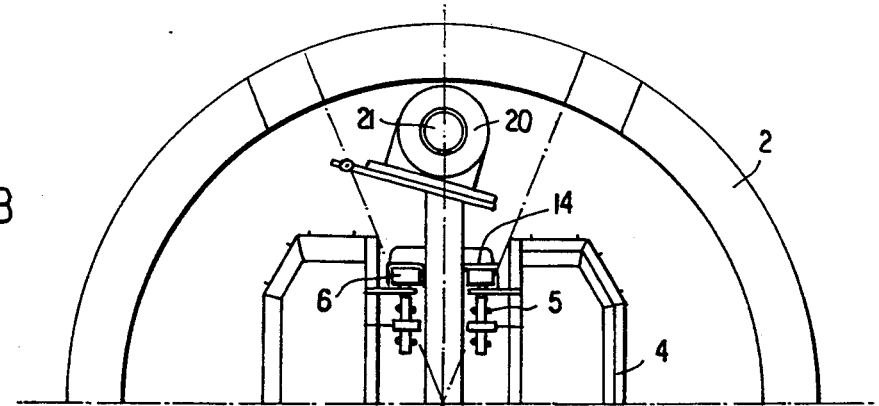
FIG. 5B
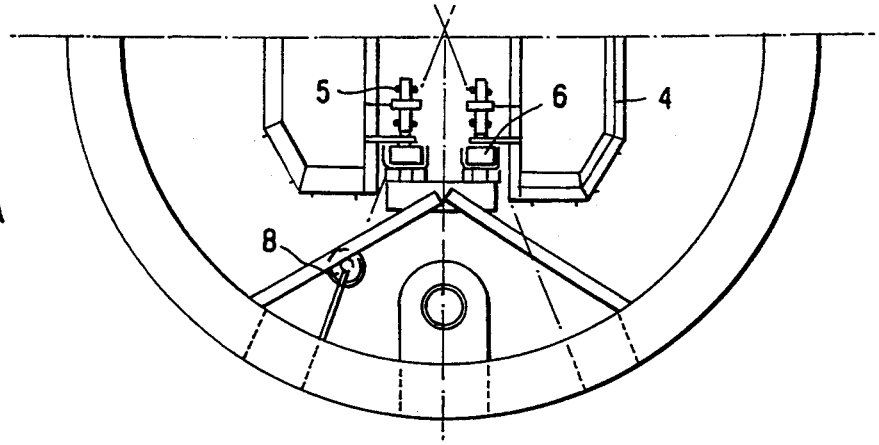
FIG. 5A

SHIP LOADER OR UNLOADER

BACKGROUND OF THE INVENTION

The invention relates to a ship loader or unloader including an essentially vertically extending region that can be displaced along a boom. At its lower end, this region cooperates with an essentially horizontally extending region. The ship loader or unloader further includes a bucket mechanism that is driven by means of chains and is guided on rollers in the vertical and horizontal regions.

DE-OS [German Unexamined Published Patent Application] 3,029,863 discloses a movable ship unloader for the continuous removal of bulk materials by means of an endless vertical conveyor in the form of a bucket mechanism formed at a vertical carrier. The lower end of the vertical carrier is rigidly connected with an essentially horizontal take-up arm and has an L shape. A bucket chain is guided around the vertical carrier and the take-up arm in such a manner that the bulk material can be conveyed continuously and without transfer from the region of the horizontal receiving arm through the region of the vertical carrier to a radially configured upper discharge end provided in the extension thereof and from there to a horizontally arranged turntable or ring conveyor that encloses the upper end and is mounted concentrically therewith.

The vertical conveyor constructed of a vertical region and a horizontal region is supported in the region of its upper end at the free end of a boom. In dependence on the quantity of bulk material to be unloaded, this vertical conveyor has a very high weight so that relatively large counterweights must be provided on the other side of the boom. These devices can be used relatively without problems for ships in port where there is little wave action and they are also suitable for high bulk material discharges. However, if water conditions exist which cause the ship's body to be raised and lowered at given intervals or in surges, difficulties arise in adapting the vertical conveyor to these movements. Although it is possible to further increase the counterweight such an increase requires the consideration of greater expenditures for controls, with the control system not necessarily being able to adapt the relatively heavy vertical conveyor to the rapid fluctuations in the ship's movements. Consequently, the danger continues to exist that collisions might occur between the vertical conveyor and the ship which, under certain circumstances, could lead to damage to one or the other or both.

SUMMARY OF THE INVENTION

It is the object of the invention to modify a ship loader or unloader of this type so that it is able to follow vertical movements by the ship without problems and without it being necessary to increase the counterweight.

This is accomplished by the invention in that the support of the horizontal region can be displaced relative to the vertical region in dependence on vertical movements by the ship while simultaneously compensating for the changing chain lengths.

With this measure it is ensured that only a part of the actual weight of the vertical conveyor must be lifted essentially parallel to the ship or the ship's hull so that greater counterweights or complicated controls are avoided.

The lifting is effected by at least one hydraulic cylinder which is supported in the vertical region, on the one hand, at supports of the latter and, on the other hand, at abutments in the horizontal region. Other lifting devices, such as ropes, spindles or the like are also conceivable here.

The simultaneous length equalization of the chains is effected by way of a so-called hydraulic coupling (length equalization device) which preferably is also formed of at least one hydraulic cylinder that is disposed on the side of the horizontal region and extends between a support for the horizontal region and the chain wheel or wheels. Other mechanical devices such as, for example, spindles, can also be employed.

The changes in length in the vertical region are thus displaced into the horizontal region and are compensated by the length equalization device.

Monitoring elements, such as, for example wire strain gauges, are provided in the vertical region so as to detect tilting during the raising and lowering of the horizontal region relative to the vertical region and effect a compensation by the activation of hydraulic elements and actuation of the horizontal cylinder or cylinders or the vertical cylinders.

So-called distance sensors or pressure elements are provided in the vertical region and/or in the horizontal region to detect in a timely manner the rising or falling of the ship's hull as a result of wave action and thus lead to a rapid response of the respective cylinders.

BRIEF DESCRIPTION OF THE DRAWINGS

The invention will now be described with reference to an embodiment thereof that is illustrated in the drawings, in which:

FIG. 3A shows a sectional view seen along lines 3A—3A of FIG. 1;

FIG. 3B shows a sectional view seen along lines 3B—3B of FIG. 1;

FIG. 4 is a partial view of the chain guide;

FIG. 5A shows a sectional view seen along lines 5A—5A of FIG. 2; and

FIG. 5B shows a sectional view seen along lines 5B—5B of FIG. 2.

DESCRIPTION OF THE PREFERRED EMBODIMENT

Figure 1:
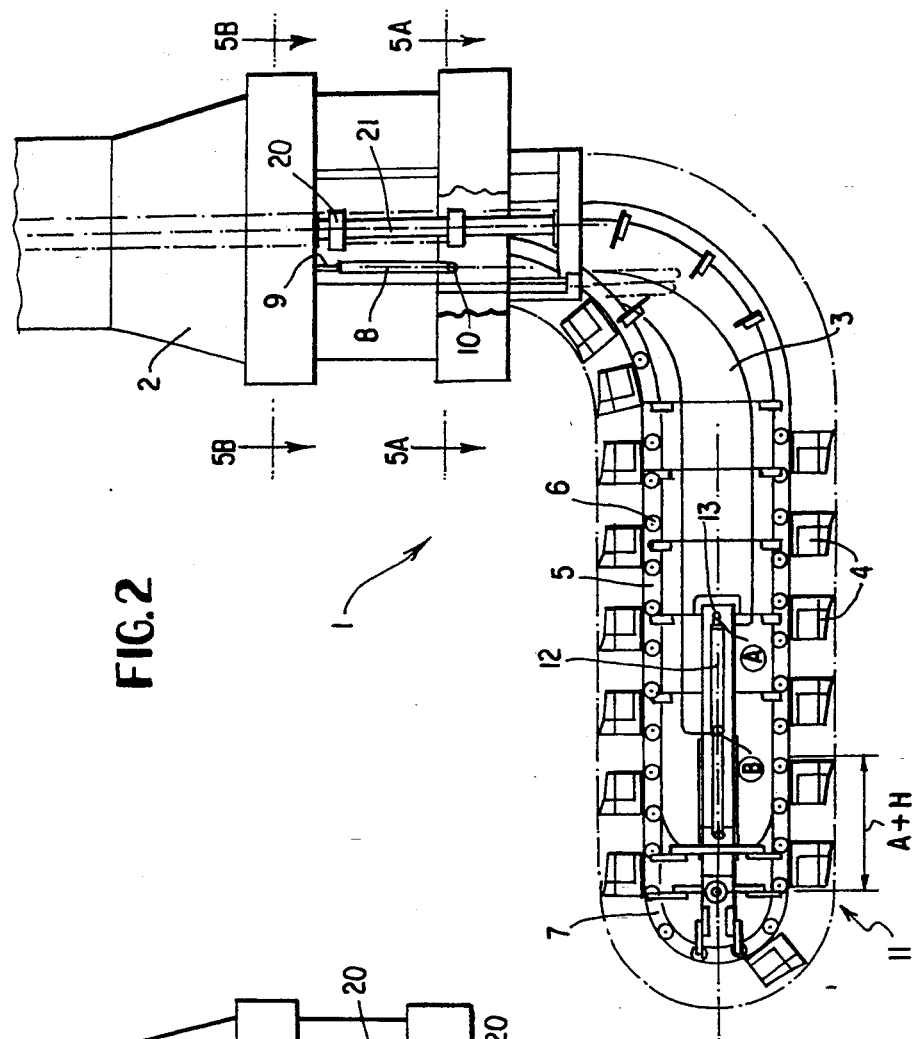
FIG. 1 is a partial view of a ship unloader in the form of a bucket mechanism including sectional views of the horizontal region.
Figure 2:
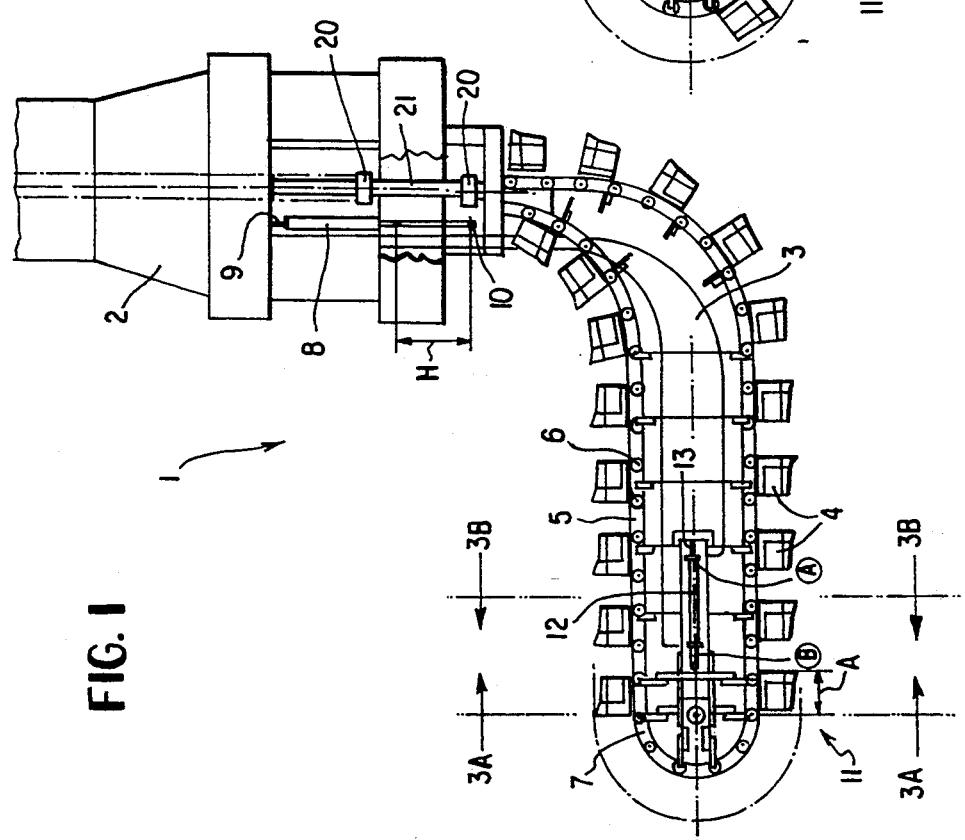
FIG. 2 is a partial view of the ship unloader of FIG. 1 including sectional views of the vertical region.

FIGS. 1 and 2 are two side views of the ship unloader 1. Shown is, on the one hand, part of the vertical region 2 and, on the other hand, of horizontal region 3, with the extension of vertical region 2 being connected with a boom that is not shown in detail. In vertical region 2 as well as in horizontal region 3, a bucket mechanism 4 is provided which is movable by means of chains 5 that are equipped with rollers 6. These rollers roll in corresponding guides that will be discussed below. In horizontal region 3, chains 5 can be reversed around appropriate chain wheels 7. In order to be able to displace horizontal region 3 upward or downward relative to vertical region 2, at least one hydraulic cylinder 8 is provided in vertical region 3. This hydraulic cylinder is supported, on the one hand, at a support 9 for vertical region 2 and, on the other hand, at an abutment 10 on horizontal region 3. It is able to cover path H. In order to be able to handle the lengthening and shortening of the chains that occurs inevitably when horizontal region 3 is raised or lowered, a length equalization device 11 is provided in the horizontal region 3, that is, in the vicinity of chain wheels 7. Length equalization device 11 is formed by at least one further hydraulic cylinder 12 which, on the one hand, is supported at a support 13 for horizontal region 3 and, on the other hand, at structural components of the chain wheel or wheels 7. FIG. 1 shows cylinder 8 in the extended position and cylinder 12 in the withdrawn position, while the situation is exactly reversed in FIG. 2. The actuation of cylinders 8 and 12 here occurs simultaneously so that, on the one hand, chains 5 will not hang through excessively and there will be no undesirable tensions. The displacement path of horizontal region 3 is here marked A in FIG. 1. Moreover, FIGS. 1 and 2 show guide rods 21 which are guided in so-called slide bearings 20 in order to thus substantially prevent tilting of horizontal region 3 during its displacement.

FIGS. 3A and 3B show sectional views through horizontal region 3 seen along lines 3A—3A and 3B—3B, respectively. Shown are bucket mechanism 4, chains 5 and rollers 6 which roll in the already mentioned chain guide 14. Chains 5 are preferably configured as circular link chains. Also shown is hydraulic cylinder 12 and a slide guide 15 with its bearing 16 that are provided on the opposite side parallel to the hydraulic cylinder so as to handle any tilting that might occur here during the length equalization of chains 5.

FIG. 4 is a partial view of chain guide 14 which is composed of a stationary outer U profile 17, a displaceable inner U profile 18 as well as a guide bar 19. Rollers 6 here run in the inner profile 18 which is displaceable relative to the outer profile 17 in the longitudinal direction of the latter.

FIGS. 5A and 5B show sectional views of vertical region 2 seen along lines 5A—5A and 5B—5B, respectively. Shown are bucket mechanism 4, chains 5, rollers 6 and chain guide 14. Also shown is a hydraulic cylinder 8 as well as the slide bearing 20 that surrounds the guide rods 21 of the vertical region 2.

What is claimed is:

1. In a ship loader or unloader including
    an essentially vertically extending first region having a lower end;
    an essentially horizontally extending second region;
    a first hydraulic cylinder connected to said lower end of said first region and to said second region for translationally displacing said second region relative to said first region as a function of vertical ship motions;
    a bucket mechanism including a chain and buckets mounted on said chain;
    cooperating guide means mounted on said chain and said first and second regions for continuously guiding said chain on said first and second regions; said guide means including a chain wheel mounted on said second region and supporting said chain; and
    chain length equalizing means provided in said second region for varying a chain length in said second region as a function of displacements of said second region relative to said first region; said chain length equalizing means including a second hydraulic cylinder effecting a length variation of said chain;
    the improvement comprising
    (a) a first support forming a part of said first region;
    (b) an abutment forming part of said second region; said first hydraulic cylinder being connected to and extending between said first support and said abutment;
    (c) a second support forming a part of said second region; said second hydraulic cylinder being a sole hydraulic cylinder connected to and extending between said second support and said chain wheel; an actuation of said first hydraulic cylinder effects a simultaneous actuation of said second cylinder;
    (d) a plurality of rollers forming part of said guide means and mounted on said chain;
    (e) a chain guide forming part of said guide means and mounted on said first and second regions, said rollers travelling in said chain guide; said chain guide comprising an outer profile member and an inner profile member accommodated in said outer profile member; said rollers being supported for travel in said inner profile member.

2. The ship loader or unloader as defined in claim 1, further comprising a slide bearing associated with said first hydraulic cylinder and a guide rod disposed in said first region and being guided in said slide bearing.

3. The ship loader or unloader as defined in claim 1, further comprising a slide guide disposed opposite said second hydraulic cylinder and a bearing cooperating with said slide guide.

4. The ship loader or unloader as defined in claim 1, wherein said outer profile member has a length dimension; said inner profile member being displaceable relative to said outer profile member in a direction of the length dimension thereof.

5. The ship loader or unloader as defined in claim 1, wherein said inner and outer profile members have a U-shaped cross section; further comprising a guide bar positioned between said inner and outer profile members.

* * * * *